(12) United States Patent
Schroeder

(10) Patent No.: US 8,581,962 B2
(45) Date of Patent: Nov. 12, 2013

(54) TECHNIQUES AND APPARATUS FOR TWO CAMERA, AND TWO DISPLAY MEDIA FOR PRODUCING 3-D IMAGING FOR TELEVISION BROADCAST, MOTION PICTURE, HOME MOVIE AND DIGITAL STILL PICTURES

(76) Inventor: Larry Hugo Schroeder, Iowa City, IA (US)

( * ) Notice: Subject to any disclaimer, the term of this patent is extended or adjusted under 35 U.S.C. 154(b) by 470 days.

(21) Appl. No.: 12/854,159

(22) Filed: Aug. 10, 2010

(65) Prior Publication Data

US 2012/0038746 A1 Feb. 16, 2012

(51) Int. Cl.
*H04N 13/02* (2006.01)

(52) U.S. Cl.
USPC .......................................................... 348/47

(58) Field of Classification Search
USPC .......................................................... 348/47
See application file for complete search history.

(56) References Cited

U.S. PATENT DOCUMENTS

| | | | | |
|---|---|---|---|---|
| 4,523,226 A * | 6/1985 | Lipton et al. | ..................... | 348/49 |
| 5,233,639 A * | 8/1993 | Marks | .............. | 378/42 |
| 5,381,236 A * | 1/1995 | Morgan | ........................ | 356/609 |
| 5,504,547 A * | 4/1996 | Mizukawa | ..................... | 396/378 |
| 6,288,838 B1 * | 9/2001 | Ito | .................................. | 359/377 |
| 6,351,537 B1 * | 2/2002 | Dovgodko et al. | ............. | 380/54 |
| 2004/0114033 A1 * | 6/2004 | Eian et al. | ....................... | 348/42 |
| 2005/0149231 A1 * | 7/2005 | Pretlove et al. | ............... | 700/264 |
| 2005/0264527 A1 * | 12/2005 | Lin | ................................ | 345/156 |
| 2008/0059578 A1 * | 3/2008 | Albertson et al. | ............. | 709/204 |
| 2008/0246757 A1 * | 10/2008 | Ito | ................................ | 345/419 |
| 2009/0167843 A1 * | 7/2009 | Izzat et al. | ..................... | 348/43 |
| 2009/0180663 A1 * | 7/2009 | Stoddart et al. | ............... | 382/100 |
| 2010/0259594 A1 * | 10/2010 | Johansson et al. | .............. | 348/43 |
| 2012/0176477 A1 * | 7/2012 | Givon | ............................ | 348/46 |

\* cited by examiner

*Primary Examiner* — Sath V Perungavoor
*Assistant Examiner* — Peter D Le

(57) ABSTRACT

Utilizing two cameras as image sources, and two displays for visual presentation, it is possible to render still or moving pictures that can be viewed stereographically. Using special adapters and techniques, this dual-picture approach allows the viewer to see images in three-dimension space. By following simple set-up procedures and limitations imposed by human vision, three-dimensional images can be produced in any digital or analog media, or combinations of these two. These techniques can be applied to print media as well.

2 Claims, 12 Drawing Sheets

Oblique view of 3D "glasses."

Overhead view.

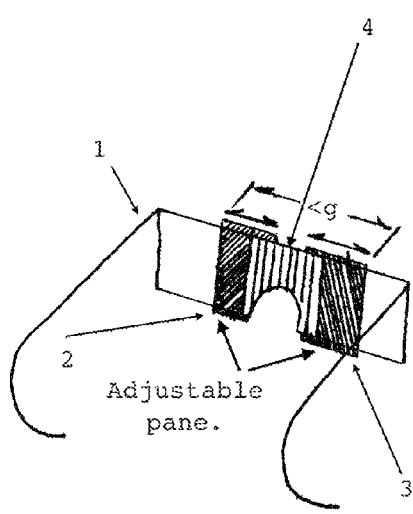
Figure 1A. Oblique view of 3D "glasses."
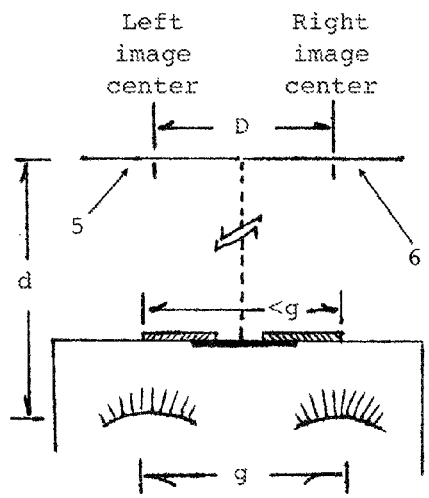
Figure 1B. Overhead view.
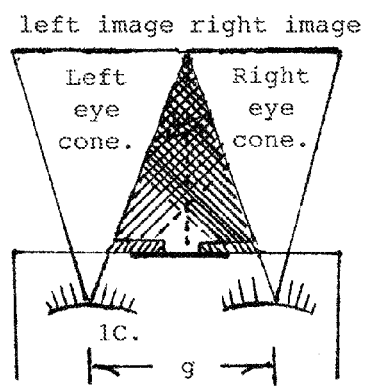
Figure 1C. Overhead depiction of occluded region.

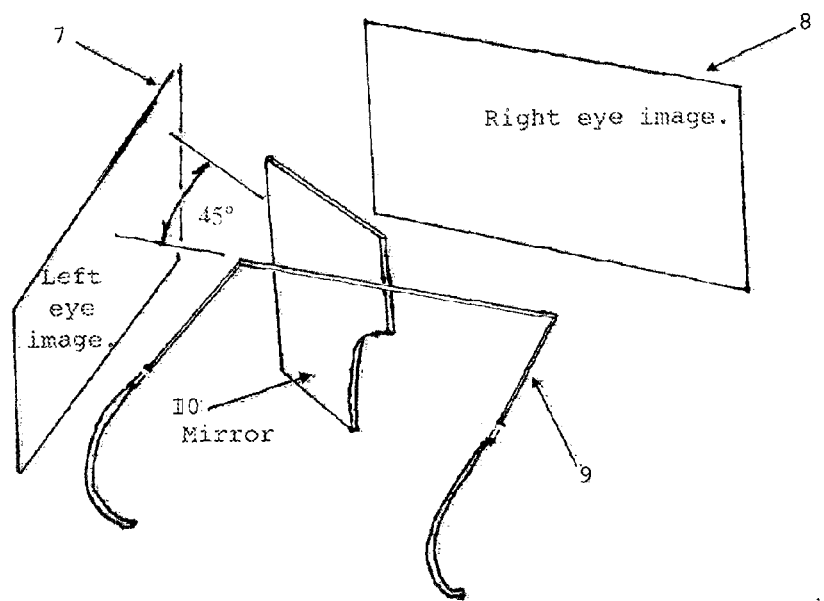
Figure 2A. Single mirror, for perpendicular images.
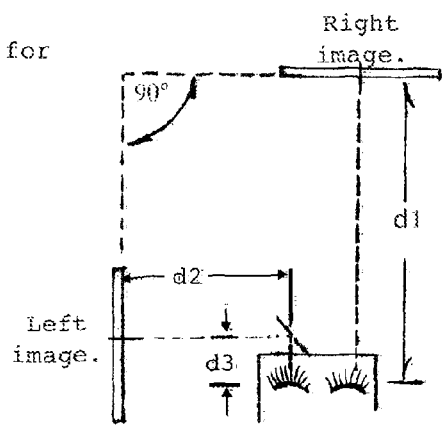
Figure 2B. Overhead depiction of perpendicular images.

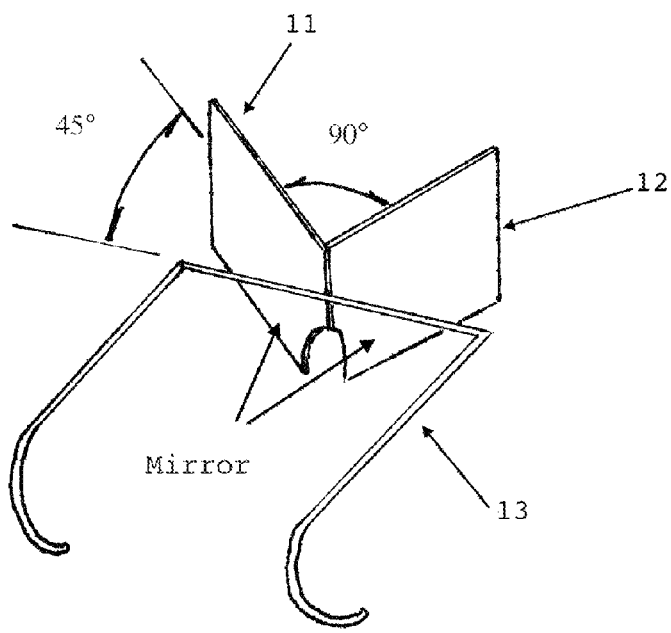
Figure 3A. Dual mirror glasses for parallel images.
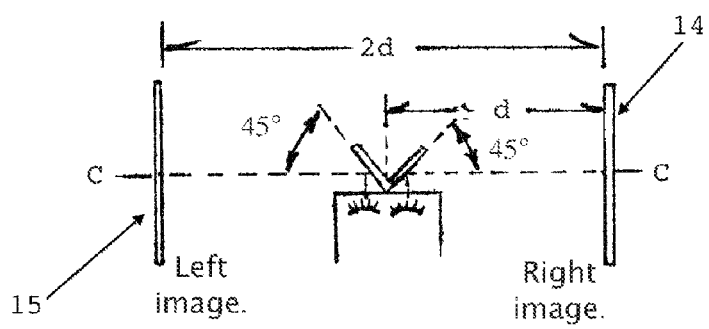
Figure 3B. Overhead depiction of parallel image setup.

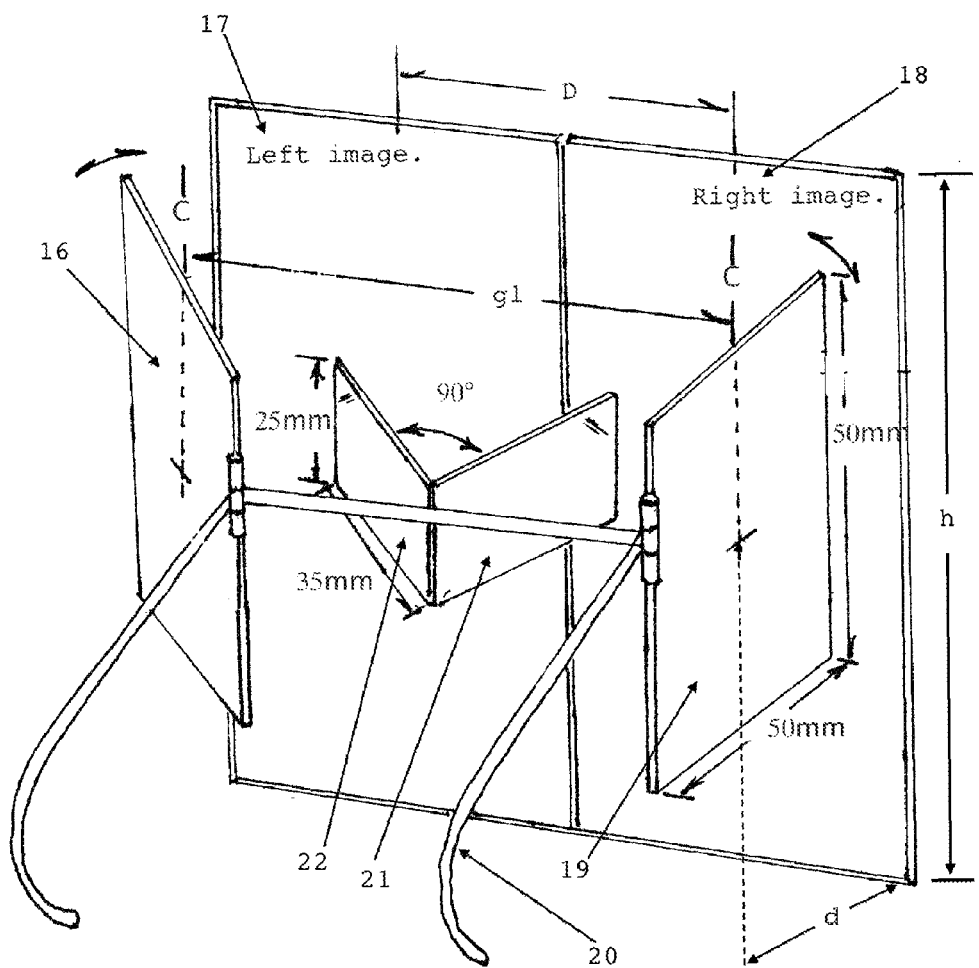
Figure 4. Quad mirror glasses with adjusable outer mirrors.

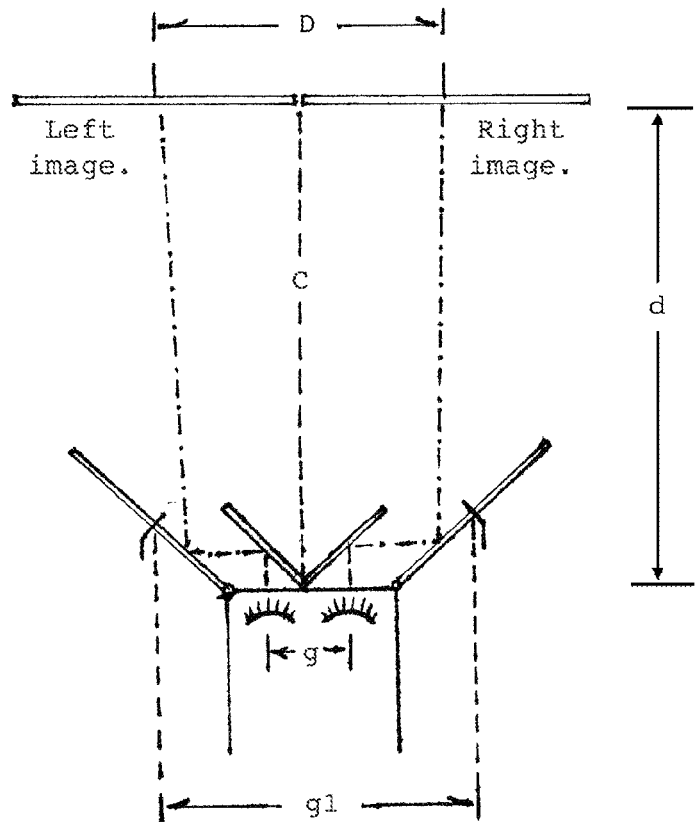
Figure 5A. Overhead depiction of quad mirror glasses.
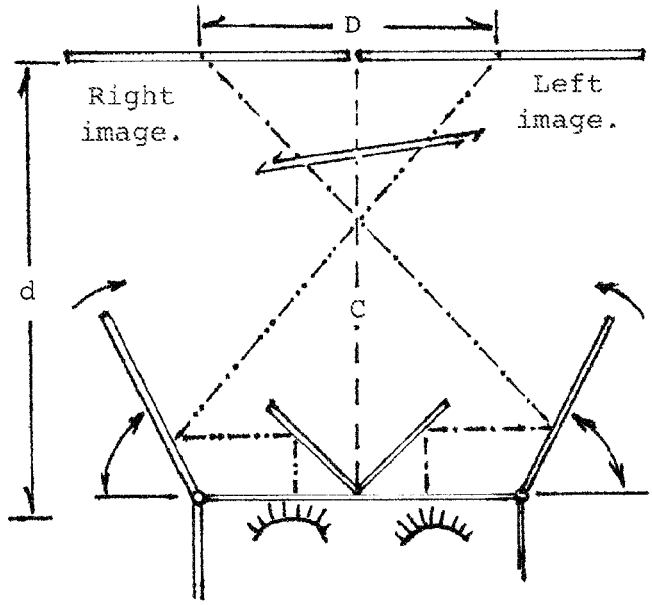
Figure 5B. Overhead depiction of quad mirror glasses viewing large images.

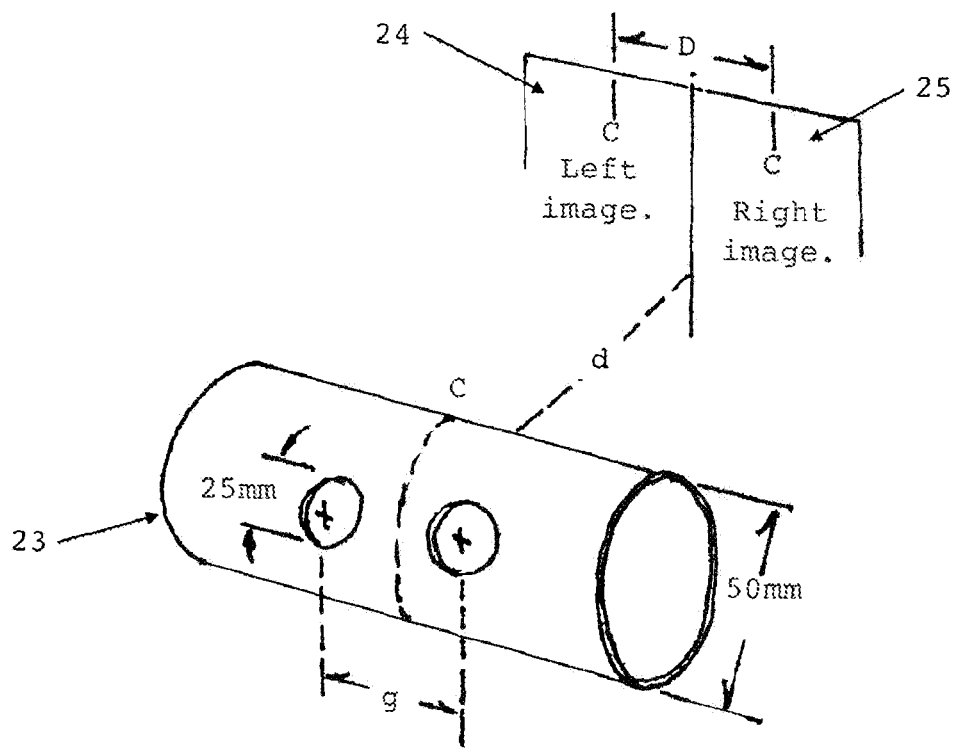
Figure 6A. Quad mirror viewer for side-by-side images.
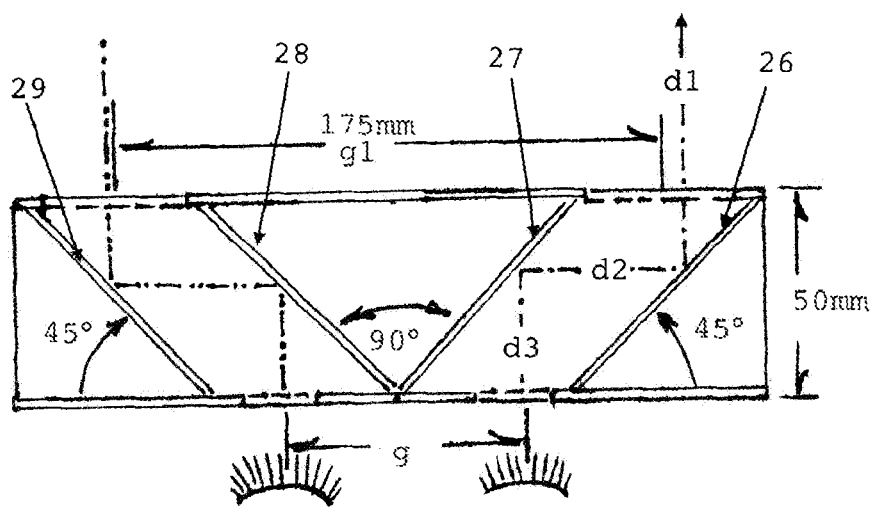
Figure 6B. Cutaway depiction of quad mirror cylinder viewer.

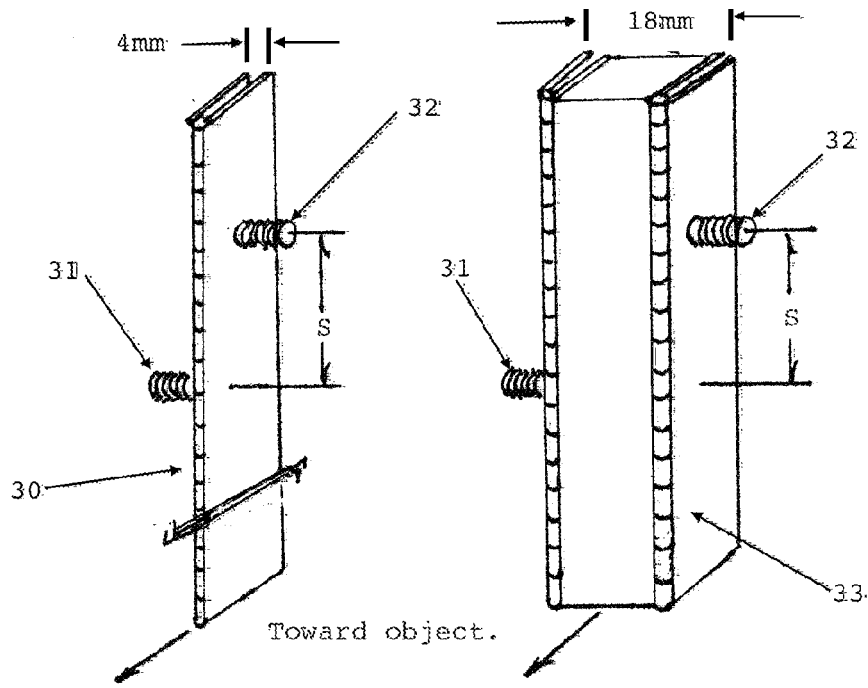
Figure 7A. Single and dual hinge camera mounting bracket.
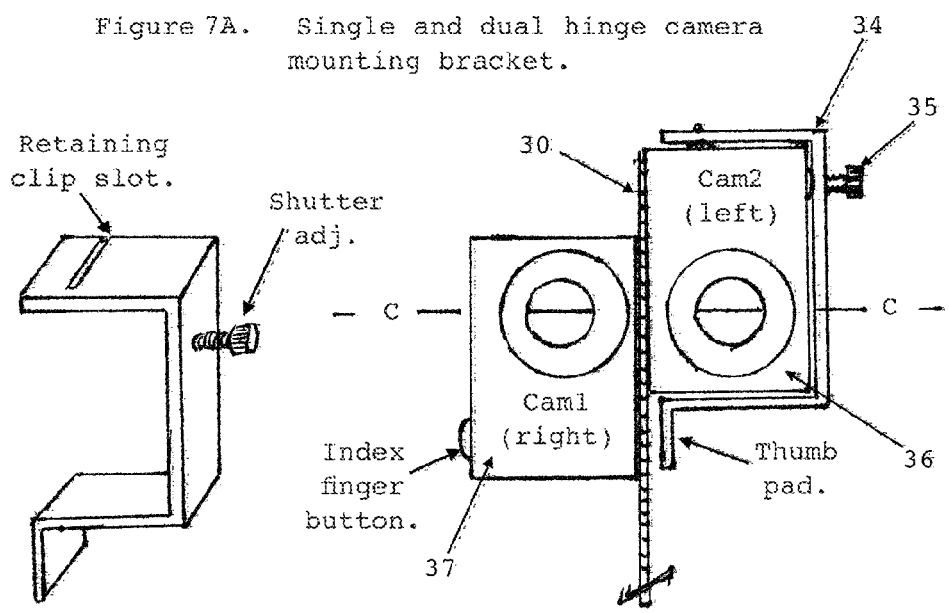
Figure 7B. Actuator bracket and shutter adjust screw.
Figure 7C. Dual camera arrangement for 3-D photos and movies.

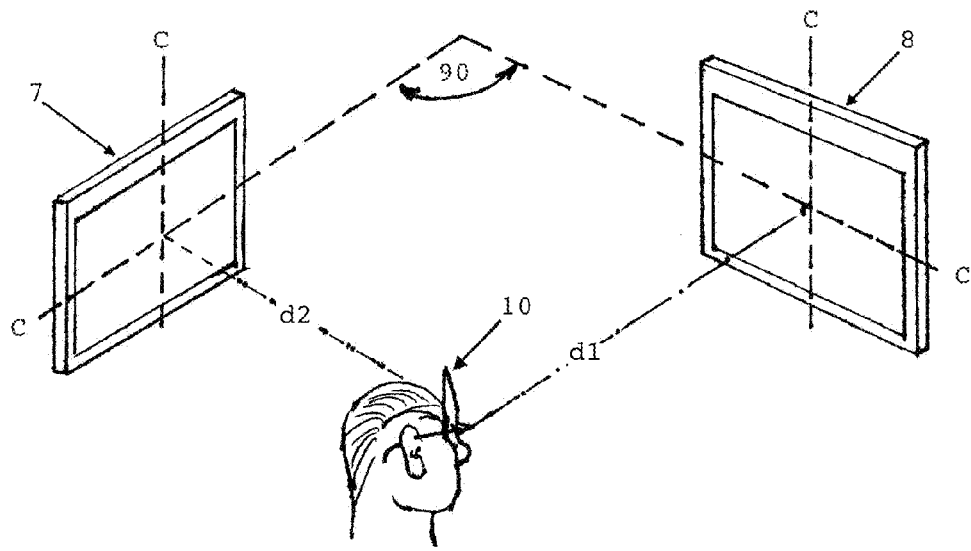
Figure 8A. Setup for single mirror viewing of perpendicular displays (left image flipped horizontally).
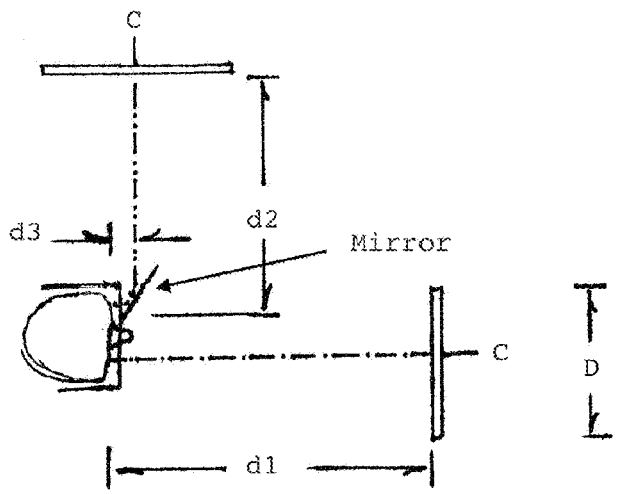
Figure 8B. Overhead depiction of perpendicular image viewing.

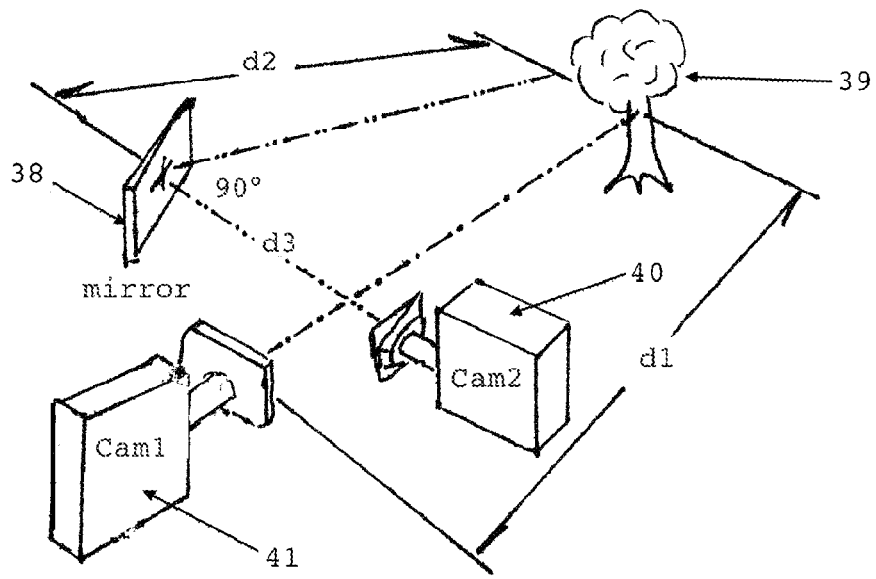
Figure 9A. Dual camera setup for viewing on perpendicular displays.
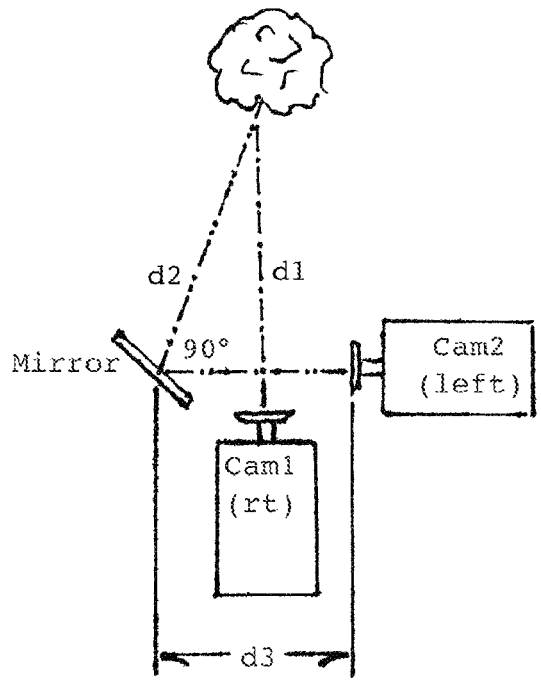
Figure 9B. Overhead depiction of camera and mirror setup for viewing on perpendicular displays.

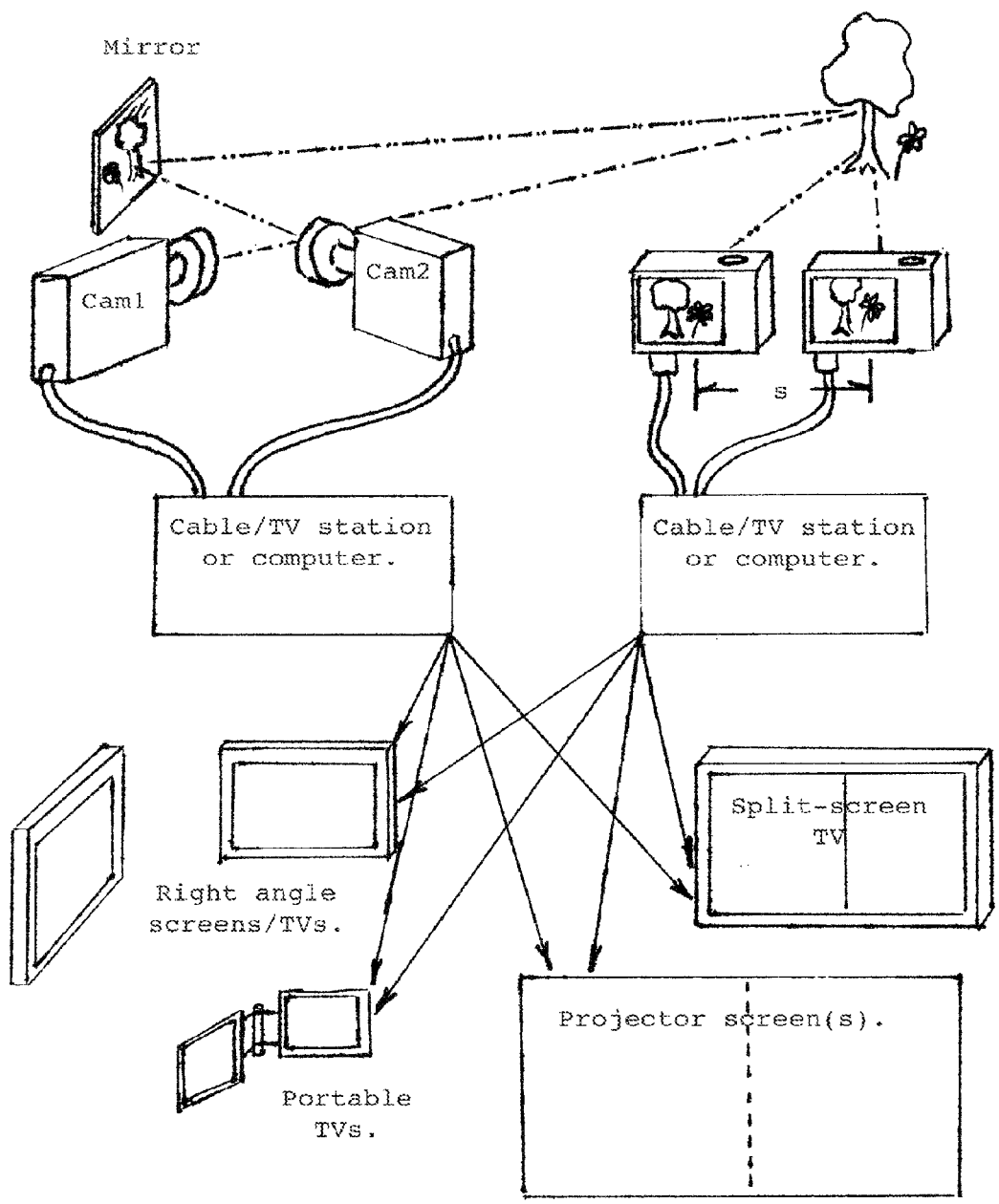
Figure 10. Different two-camera source and dual display options for live-action or recorded 3D images.

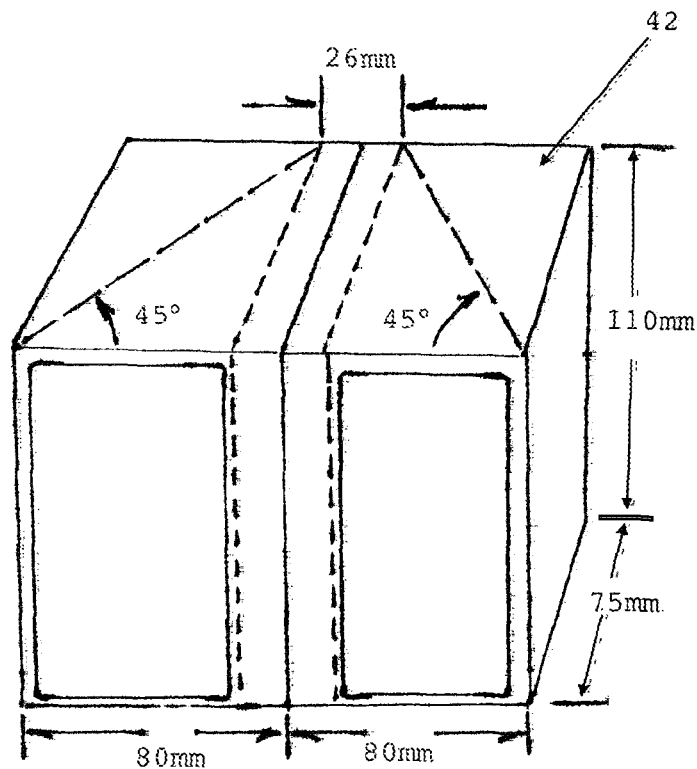
Figure 11A. Box containing two parallel LCD displays for 3-D
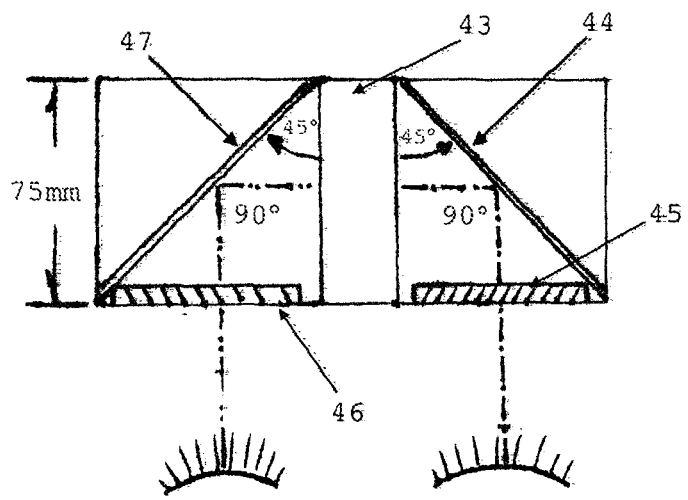
Figure 11B. Overhead view of viewing box elements.

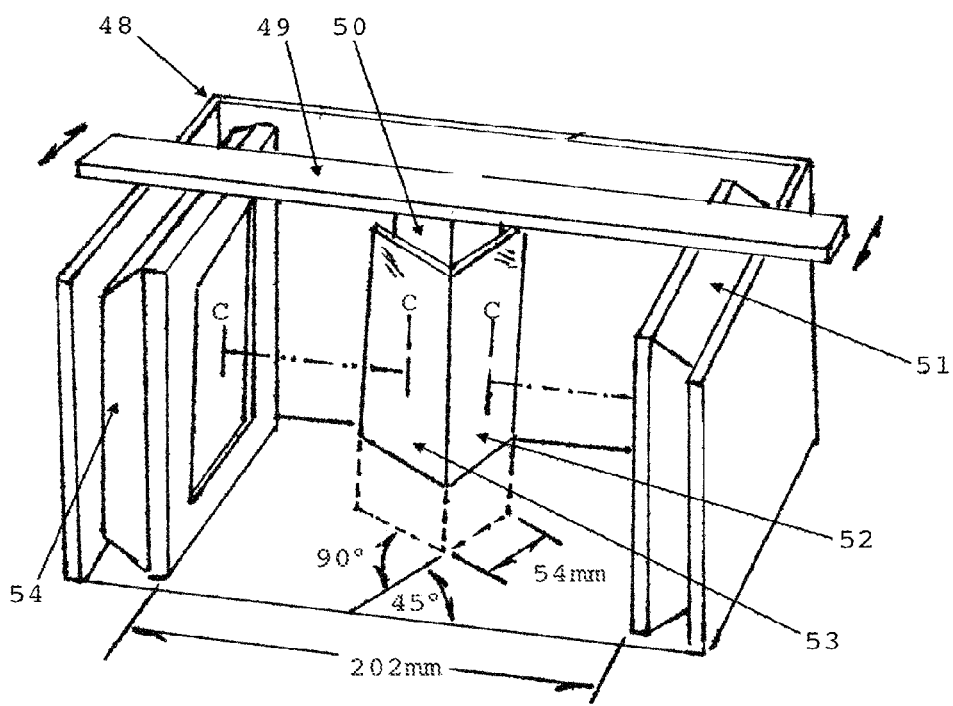
Figure 12A. Setup for parallel digital flat panel displays (front cover removed.)
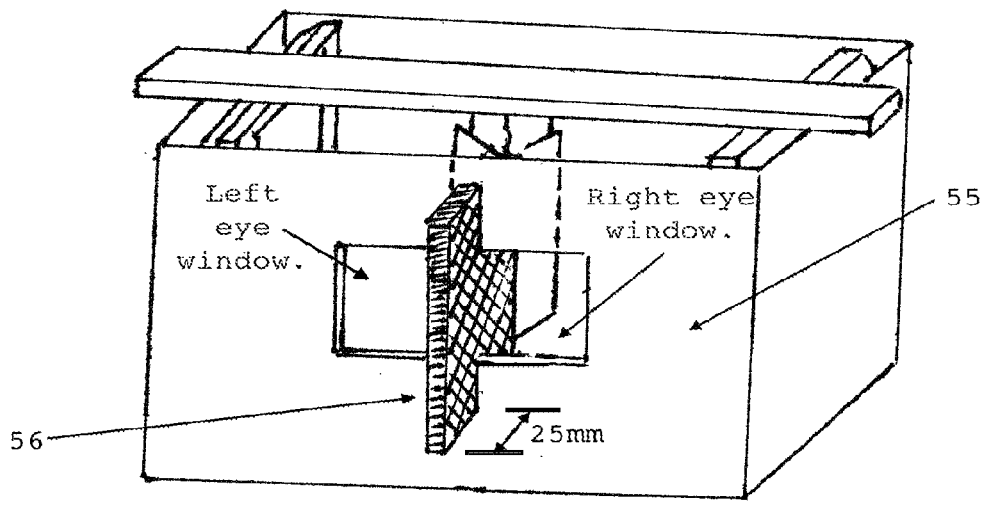
Figure 12B. Parallel display box with cover showing occlusion pane.

TECHNIQUES AND APPARATUS FOR TWO CAMERA, AND TWO DISPLAY MEDIA FOR PRODUCING 3-D IMAGING FOR TELEVISION BROADCAST, MOTION PICTURE, HOME MOVIE AND DIGITAL STILL PICTURES

BACKGROUND OF THE INVENTION

This submission will present original applications of devices and techniques for producing 3-D images using standard cameras, monitors, TVs, or print media. Off-the-shelf devices are used along with hand-made adapters to provide the best results. The techniques are simple and applicable in a variety of situations. Thus, the 3-D result is a combination of camera input images, and output displays viewed by the eyes. The recipe of combinations of viewing aid, camera orientations and display positions, will yield optimal viewing for one person.

Figures depicting dual cameras, displays, or both, will assume they are identical units in resolution and features, but, with care, this restriction can be eliminated. Additionally, because of the optical nature of these applications, they are scalable (within visual limits), and can be adapted to the resolution of any media. First surface mirrors are used to insure optical flatness and eliminate refraction distortions. However, thin, standard glass mirrors can be used. The mirrors can be square, rectangular, round or elliptical depending on the size and distances of the images being viewed. In all instances, two pictures will be captured and displayed.

BACKGROUND

The advancements in digital technology have produced new and dynamic ways of taking and recording visual images. However, one aspect of "visualization" has not changed: the human eye. Human vision presents exacting requirements, but we often take these requirements for granted, or ignore them. The following information is an attempt to categorize the elements of image presentation necessary for producing stereographic images (commonly called 3-D) in print, on video flat panels, CRTs, LCD projection screens, movie screens, or even a mixture of these media.

Human vision is binocular, having two light sensing detectors. The retina of each eye contains photoreceptors that are sensitive to different wavelengths of light. The highest concentration of receptors is in a region called the fovea. The best vision occurs when the eye focuses light from the image being viewed onto the fovea. This region of the eye is only about 1 mm in diameter but contains the highest density of receptors. The entire retina is about the area of a 35 mm film frame, or 875 square millimeters. All the information from the retina, but especially the fovea, is passed along the optic nerve from each eye to the brain.

The pupil of the eye is a circular aperture that lets light into the eye. The iris regulates the amount of light entering the eye and can vary this aperture between about 1 and 4 millimeters diameter. With the aide of the lens of the eye, this aperture defines a cone of light that impinges on the retina. If you trace this cone of light outward from the eye, you will get a cone of vision for each eye. Within this cone will be all the objects that the eye can "see." Because there is a gap between the pupils of the eyes, the interpupillary distance (IPD), the vision related neural networks analyze these differences. The brain then categorizes these differences in terms we call color, size, shape, motion, etc., but most importantly for this treatise, depth or stereographic vision.

The neural networks actually meld the two distinct images (the eyes do not see identically the same thing) from each eye into one "vision." Since this vision is constructed from two images, if you control what is presented to each eye, you can control the resultant image. However, because these neural pathways and their function become set in early adolescence, limits are set by the brain as to what is acceptable, and what is distorted, distracting, or even annoying.

In normal vision the pupils can look straight ahead or come closer together; the IPD may get smaller by a few millimeters, but it doesn't get wider. So, when at rest, the cone of vision for each eye produces a field of view. The sum, or "vision," of these two cones of view can be called a cone of convergence. Anything within the cone of convergence will be interpreted as a single image as long as that image does not exceed parameters laid down by the neural networks. The IPD is smaller for children than adults, and usually smaller for women than for men. But it normally is between 60 and 75 millimeters. For subsequent examples this treatise will use a distance of 66 mm.

If each eye is presented with a unique image, in order for the neural networks to make a single picture, the centers of the cones of vision must be able to focus on the same object. Any vertical or horizontal lines must match up. The objects duplicated in each cone of vision must be the proper size, shape and color. If an object is in one cone, but not the other, it will appear as a "phantom" image and cause confusion. Any size, shading, color, angle, or position difference is processed into the final single image. Gross differences may be considered distortions and cause confusion in the viewer, or may be interpreted as curious, but abnormal.

Whatever information reaches the eyes the neural networks will attempt to make a single "view" which it understands. Memory is sometimes used to reconstruct partial images; "fill-in" any information which is obstructed; or determine which part of the view deserves more attention.

When each eye is presented with a unique image, a left image and a right image, a recipe of limits must be followed. And the recipe varies as the sizes of the viewed images changes. But one primary rule, for the best "vision," is that the centers of the images being viewed must be aligned with the centers of the cones of vision. For the unaided eye (20-20 vision), at a distance of 25 cm., the image centers must be separated by no more than the IPD. In routine daily activity, humans look at objects where the image centers are the same (distant images) or the image center separation is small compared to the IPD (reading). However, if someone is "daydreaming," they may relax their eye muscles to the point where they see "double." But actually, they are just aware of what each retina is sensing separately.

Because our eyes are set apart horizontally, we are more use to looking at wide and short images. But if a left and a right image have centers that are too far apart, our vision processing networks cannot produce a single image. Two 3 by 5 postcards of the same scene, set side by side and at normal reading distance, cannot be viewed as one picture without some form of visual aid. There are a host of these devices: telescopes, binoculars, microscopes, etc. to change objects to a size our eyes and our neural networks can handle.

If two (left and right) images are small, and close together, with a visual aid these images can be viewed quite easily. Stereographic viewers from the late 1800s used this approach. However, these devices were limited by the IPD to picture sizes of about 70 mm, or a postcard sized "pair" of pictures. Lenses helped magnify the detail in the small picture, as well as constraining the field of view so distractions could be minimized. By manipulating the cone of vision for each eye it is possible to change the size and even position of the objects being viewed. And, as long as the two images share enough common information, the vision networks will produce a single image. As long as each eye can detect a corresponding image in its respective field of view, it will focus on the image and pass it on to the vision network. There the two images will be merged into one view.

One prominent artifact of stereographic viewing (one picture presented to each eye) is that there are three images in the field of view. A left and right picture will appear to each side, respectively, of the "stereo" picture. This "wide-eye" view contains the left and right images as bookends on the 3-D result.

Different arrangements of mirrors can accommodate variations in the relative position of objects, but care must be taken to preserve the apparent size, distance, focal distance and alignment of those objects in the field of view. Because human vision highlights differences in the field of view, taking advantage of these "discrepancies" could lead to interesting special effects, or even enhanced information. But those concerns are beyond the scope of this submission.

Normal human vision (20-20) is able to distinguish one minute of arc in the field of view. For an object at a distance of one meter this is almost precisely 0.29 mm. Most modern, desktop LCD displays will have pixels of approximately this size. If the object is moved farther away, say 2 meters, then in order to resolve the detail that was seen at 1 m., the object must be made twice as big. This linear scaling can occur along the cone of vision unless the object becomes too close or too far away to maintain focus. Again, magnifying glasses, binoculars or other viewing aids can extend or shrink these distances. But this linear scaling is one of the reasons the two object being viewed in a stereographic presentation need not be exactly the same size (although it simplifies the design setup). If the right eye is looking at a picture that is twice as big, but twice as far away as the picture being viewed by the left eye the two images will appear to be the same size.

When viewing a TV, a viewer sits at a distance normally between 2 and 3 meters. Home theater viewing is in the 3-5 meter range. Large lecture halls project images so they can be viewed from 4 to 16 meters. Regardless of the size of the viewed images, their light must pass through the pupil of each eye and impinge the retina. As long as corresponding elements of the images can be manipulated so they appears to be in the field of view, the vision networks will attempt to create a unified view. An interesting result of this neural processing is that the images don't have to be identical in size or sharpness. The brain will take the "best" elements for either retina to create the final view.

Because of the adaptability of neural networks, it is difficult to specify exact distances and ratios for a stereographic application. The most general approach, which this submission has taken, is to demonstrate some limits for the size and orientation of images yielding easily viewable results. And there are, most likely, exceptions to this approach, but individuals who have trouble reading or focusing on a plane of information may be able to benefit from tailoring an image in front of each eye.

The most critical aspect of vision is the eye's ability to focus the viewed image near or onto the fovea of the retina. This small, 1 mm. diameter, area at the back of the eye contains the highest density of cones for color vision and reading. Regardless of how big the picture is in the field of view, it is only the information on the fovea that is seen in the highest detail. So, the best vision is actually in a small area (about 2 degrees) of the field of view, and our eyes "pan and scan" across the visual field to obtain information. Because the eyes and brain can do this very rapidly, humans can view a full 180 degrees in front of them and think of it as one focused picture.

SPECIFICATIONS

The visual aides in FIGS. 1A-5B are devices worn or held by the viewer depending on the size and orientation of the right and left images being viewed. In FIG. 1A, the adjustable blinders (2, 3) restrict the field of view of each eye. The frame (1) holding the blinders can be sized to fit over glasses. A fixed panel (4) in the center of the glasses can used to further eliminate distracting light sources. Thus, a pair of images whose centers are less than the IPD of the viewer (g in the drawings) will be seen in 3-D as a single image. FIG. 1B shows two pictures (5, 6) each with a width D, and the adjustable pane glasses. At the closest viewing D cannot exceed g (66 mm), and the panes would be adjusted to limit the cone of vision of each eye. FIG. 1C depicts the restricted cone of vision for each eye. Each picture would be 57-63 mm. in width. If the picture width is larger than the IPD, it must be moved away from the viewer. This can be done until the resolution becomes too small.

FIG. 1A is only one form of the glasses. Any object (even the side of the hand) can be used to occlude one eye from seeing what the other is viewing. If the images are large, but far enough away, these glasses will also work. In general, as long as the image center distance, D, is less than $\frac{1}{10}$ of the distance from the viewer to the images, d, the viewer can be trained to resolve the pair into a 3-D image.

However, in order to get the largest image viewable at the shortest distance a different approach must be taken. In FIG. 2A, a mirror (10) placed on a frame (9) at 45 degrees to the direction of vision will change the cone of vision for that eye, but not otherwise distort the image being viewed. The reflective side of the mirror is toward the viewer. In fact, if the horizontal center of each picture (7, 8) is in the same plane, as well as the horizontal plane of the viewer's eyes, all lines and angles will correspond. The resultant view will appear to be in front of the viewer. Because the mirror will reverse the right-to-left orientation of the image (7) it must be flipped horizontally before being displayed. This arrangement will work for images from 50 mm to several meters width. Photo editing software can do this quickly, and LCD projectors have a setup option to do this as well.

FIGS. 3A and 3B show a pair of dual mirror (11, 12) glasses (13) viewing a pair of displays (14, 15) or pictures that are parallel to each other. The reflective side of each mirror is toward the viewer. The viewer is at the midpoint of the distance between the two displays. The mirrors are at 45 degrees to the line of vision for each eye. For this setup both source images would have to be reversed horizontally to be seen as they were originally taken.

The quad mirror glasses (20) in FIG. 4 have a dual capability. Because the viewer is looking at each image (17, 18) using a pair of mirrors, right-to-left image orientation is normal. The IPD becomes larger by a factor of two or more (g1). Therefore, the images can be larger and more detailed. Because the cone of vision gets larger as you move away from the eye, the outer pair of mirrors (16, 19) is larger than the inner pair (21, 22). The reflective side of the inner mirrors faces the viewer while the reflective side of the outer mirrors faces the objects being viewed. They are shown as 50 mm square, but they could be sized to the images being viewed. They could be much larger, until the glasses become cumbersome or unwieldy.

FIG. 5A shows the quad mirrors in a fixed position for page-sized or smaller images. However, in FIG. 5B the outer mirrors are rotated such that they look at what would normally be the opposite side of the 3-D pair. If the left and right images are now swapped the brain will not know the difference. There will be some trapezoidal distortion, but for a viewer on the midline of the two images, it will be symmetric. Therefore, if each image is several feet across, like a lecture screen or large display, the fields of view can be crossed, and the cone of vision will be interpreted as looking at the center of the image. The brain can compensate for some differences in image sizes, but there is a limit to how far off axis a viewer can sit and still resolve the picture. The best viewing position would be on the midline of the abutment of the two images.

Pictures as wide as 175 mm. (24, 25) can be viewed at a distance of 50 cm. by the dual-periscope device shown in FIGS. 6A-6B (item 22). The quad set of mirrors (26, 27, 28, 29) allows the IPD to be artificially expanded to a distance g1. With this viewer, two pictures of a 3-D pair nearly page size (8½"×11" each) can be seen stereographically. This permits more detail to be seen and with easier viewing. The cut away view in FIG. 6B shows the orientation of the four mirrors used (the same as FIG. 4). The cylinder wall also allows some masking of spurious reflections.

One method of taking stereographic pictures is depicted in FIG. 7C. A pair of digital cameras (36, 37) is mounted, in portrait orientation, on a section of hinge (30) or two hinges (33). This orientation was dictated by the need to use a single motion to simultaneously actuate the two shutters. A special bracket (34), shown in FIGS. 7B and 7C, permits the index finger and thumb to snap the pictures in one pincer motion. A small adjustment screw (33) is used to more precisely set the shutter action. One of the most critical adjustments for dual-camera snapshots is the alignment of the horizontal centers of the cameras' lenses (line C-C). The distance, s, between the mounting screws (31, 32) must be within 1 mm. to minimize the need to crop and edit pictures.

The distance between the vertical centers of the cameras depends on the distance of the images being photographed, and the cameras' zoom setting. As discussed earlier, the brain can resolve two images as long as their image centers' separation is not greater than 1/10 the distance to the viewer. Therefore, the camera separation can be the distance to the object divided by 10 times the zoom setting. However, only cameras with shared or wireless remote controls for zoom, focus, and shutter can accomplish any distance larger than the spread of your thumb and index finger. In this depiction (FIG. 7C) the vertical centers are about 66 mm. apart.

There is a unique way of avoiding the size restriction of side-by-side images on a monitor or TV. FIGS. 8A-8B show the single mirror glasses depicted in FIG. 2A utilized to view two TVs. (The mirror could be in front of either eye.) In this depiction the left eye is restricted to seeing only what is perpendicular to the view of the right eye. With a properly sized mirror, the display image can be any size. However, it is necessary to compensate for the fact that the mirror will flip the viewed picture horizontally. Thus, the left image must be reversed, either at the source camera, or electronically. This is quit easy to do with a digital projector, but TVs and monitors do not permit this currently. There are a myriad of software packages that can do this for still pictures.

In this perpendicular setup, the light from the right image display to the right eye travels a distance d1. The light from the left image display, deflected by a mirror, has a path length that is the sum of d2 and d3. In the simplest configuration, if the displays are identical, d1=d2+d3.

For movies or live-action presentations, cameras can be positioned as depicted in FIG. 9A. The mirror (38) is positioned at 45 degrees to the line of sight of Camera 2 (40). A sturdy mounting plate (not shown) can insure alignment. Camera 1 (41) is positioned perpendicular to camera 2. The object being viewed (39) appears in the normal right-to-left orientation of Camera 1. However, because of the mirror in the path of Camera 2, its image is reversed left-to-right. Using a two channel transmission, a viewer as depicted in FIG. 8A could view the 3-D presentation on a pair of TVs.

An observer at the position of the object depicted as a tree (39) would see Camera 2 at a position to the right of Camera 1 and at a distance of d2+d3. This provides the separation needed for a 3-D image. The easiest setup is, again, d1=d2+d3.

FIG. 10 is a cartoon representing some of the different combinations of camera setups and display orientations. Cameras 1 and 2 can be studio, camcorder, photo, or even analog. The cameras can be perpendicular or side-by-side to each other. Pictures from the camera pair can be passed on to the cable or TV station for transmission over cable systems or digital airway. The receivers could be two perpendicular TVs; a split-screen TV with two tuners; side-by-side projections on a large screen; or a pair of portable TVs in parallel or perpendicular orientation. The pictures could also be saved as files on computer systems for image manipulation, depending on the target media and orientation. The cameras can be directly connected to display devices as well.

Although matched pairs of cameras and displays are shown, there are other options available. A camcorder and a photo camera could act as a source-pair as long as the resulting images can be sized to closely match each other. The displays can be a different size as long as their apparent size to the eye is similar enough that the neural networks can produce a single view. However, adjusting all these different components requires longer setup time. But this variability would permit 3-D presentations to persons with special vision needs. The displays could be as small as those on a cell phone. They could also be a pairing of a laptop and a monitor, or even an iPad® and a movie screen (although setup adjustments would have to be made because of their different aspect ratios).

The variations in the two-camera, two-display approach to 3-D has the implication that many current single camera/display devices could be modified for 3-D. Adding a second camera and/or display could make cell phones or laptops 3-D media. Also, the increased resolution of displays could yield small portable 3-D viewers personalized to the individuals' preference and as common as MP3 players.

The "glasses" shown in FIG. 3A have analogous applications as drawn in FIGS. 11A through 12B. FIG. 11A depicts a viewing box (42) with mirrors (44, 47) reversed in orientation from those in FIG. 3A. The mirrors point inward to a pair of back-to-back 40×66 mm. LCD displays (43). The units are mounted vertically so their horizontal image centers appears less than 66 mm. Magnification lenses (45, 46) are used to enlarge the size of the pictures. Also, each image is reversed when stored so that it appears in the proper orientation when viewed through each mirror. The unit can display AVI files as well as JPG photos. It can display properly synchronized 3-D movie clips from the cameras depicted in FIG. 7C. The displays are battery powered, making the unit a portable 3-D viewing station.

The final diagram, FIG. 12A, shows a viewing station (48) utilizing digital picture frames (51, 54). The digital frames are oriented in the portrait position. The observer looks through a portal at a pair of mirrors (52, 53) mounted on a post (50) and at a right angle to each other and 45 degrees to the screens of the displays. This is a fixed-distance implementation of the setup described for using the viewing aid in FIG. 3A. Once again, since mirrors are used, the images must be properly flipped. They must also be rotated to portrait orientation if they were taken in landscape mode. The bar (49) holding the mirrors is slightly adjustable to accommodate different eye separations. A narrow 4 mm. pane (56) extends from the apex of the mirrors to 25 mm. beyond the box's faceplate. This restricts the cone of vision for each eye to its own mirror (much like the glasses is FIG. 1A)

LIST OF FIGURES

FIG. 1A. Oblique view of 3-D "glasses."
Viewing aid for looking at side-by-side stereographic pictures.
FIG. 1B. Overhead view.
Glasses viewing a stereographic image pair.
FIG. 1C. Overhead depiction of occluded region.
A representation of the cone of vision for each eye.
FIG. 2A. Single mirror for perpendicular images.
Glasses for viewing an image pair at a right angle to each other.
FIG. 2B. Overhead depiction of perpendicular images.
The relevant distances for best viewing are indicated.
FIG. 3A. Dual mirror glasses for parallel images.
A visual aid for looking at a stereographic set where the images are parallel and facing each other.
FIG. 3B. Overhead depiction of parallel image setup.
The viewer position and distances are indicated.
FIG. 4. Quad mirror glasses with adjustable mirrors.
A dual set of mirrors are mounted on a frame and used to view an abutted stereographic set of images. The mirrors facing the image are adjustable to accommodate different picture sizes.
FIG. 5A. Overhead depiction of quad mirror glasses.
A depiction of the alignment of the viewer and the images. The stereographic set have their normal arrangement.
FIG. 5B. Overhead depiction of quad mirror glassed viewing large images.
In this figure the image side have been swapped and the outer mirrors adjusted to view the center of the image on the opposite side of the median line.
FIG. 6A. Quad mirror viewer for side-by-side images.
A fixed-position set of quad mirrors looking at a set of fixed-width images.
FIG. 6B. Cutaway depiction of quad mirror cylinder viewer.
The location of mirrors and line of sight paths are shown.
FIG. 7A. Single and dual hinge camera mounting bracket.
Hardware is shown for mounting cameras so their lines of sight can be crossed, if needed. Their horizontal separation is also depicted.
FIG. 7B. Actuator bracket and shutter adjust screw.
This attachment permits near simultaneous actuation of the shutters of two cameras using only one hand.
FIG. 7C. Dual camera arrangement for 3-D photos and movies.
A pair of cameras is shown in their mounted positions.
FIG. 8A. Setup for single mirror viewing of perpendicular displays (left image flipped horizontally).
The position of a viewer in relation to two perpendicular displays is depicted.
FIG. 8B. Overhead depiction of perpendicular image viewing.
The distances from each eye to its respective image is shown.
FIG. 9A. Dual camera setup for viewing on perpendicular displays.
The relative positions of two broadcast or movie cameras are shown with the use of a mirror to flip one of the images.
FIG. 9B. Overhead depiction of camera and mirror setup for viewing on perpendicular displays.
This is another rendering of FIG. 9A.
FIG. 10. Different two-camera source and dual display options for live-action or recorded 3-D movies.
This drawing shows multiple ways of using a two-camera source and a dual display for viewing TV and movie presentations.
FIG. 11A. Box containing two parallel LCD displays for 3-D viewing.
This device, consisting of two, small LCD media players, permits portable viewing of 3-D picture or movie pairs.
FIG. 11B. Overhead view of viewing box elements.
The position of the mirrors and box elements are shown relative to the viewer.
FIG. 12A. Setup for parallel digital flat panel displays (front cover removed).
Two digital picture frames are used to display a stereographic set. The displays face each other and the viewer is at their midpoint.
FIG. 12B. Parallel display box with cover showing occlusion pane.
An exterior of this display apparatus with the front cover in place. Also shown is a pane of opaque material to limit each eye's field of view.

DRAWINGS

Twelve figures are appended below.

The invention claimed is:
1. A system of viewing a 3D image comprising:
at least one display device configured to display a dual sourced image;
a pair of eye glasses without filters or lenses that alter the color or shape of objects being viewed;
an adjustable pane mounted at the center of the eye glasses to prevent cross-field viewing, wherein the length of the pane can be extended based on at least the viewer's interpupillary distance (IPD), viewing distance to an object, and the size of the viewed object.
2. A method of viewing a 3D image comprising:
capturing a first image of a scene using a first imaging apparatus;
capturing simultaneously a second image of the scene, reflected from a reflective device, using a second imaging apparatus;
displaying the first and second images on two different display apparatuses; and
wherein the angle between the optical axes of the first imaging apparatus and second imaging apparatus is 90 degrees.

* * * * *